July 16, 1935.    H. E. CULLEN ET AL    2,008,202
WATER COOLER
Filed Nov. 4, 1931    5 Sheets—Sheet 2

INVENTORS
HARRY E. CULLEN
HENRY O. RONNING
By
ATTORNEYS

July 16, 1935.   H. E. CULLEN ET AL   2,008,202
WATER COOLER
Filed Nov. 4, 1931   5 Sheets-Sheet 4

INVENTORS
HARRY E. CULLEN
HENRY O. RONNING
ATTORNEYS

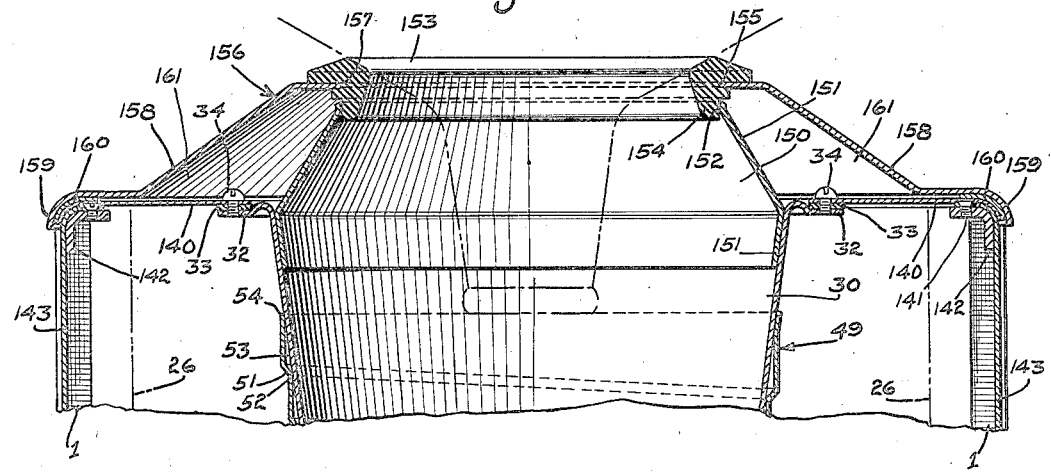

Patented July 16, 1935

2,008,202

UNITED STATES PATENT OFFICE 2,008,202

WATER COOLER

Harry E. Cullen and Henry O. Ronning, Minneapolis, Minn., assignors to Henry P. Watson, Minneapolis, Minn.; Alfred F. Pillsbury and Bessie Watson executors of said Henry P. Watson, deceased Application November 4, 1931, Serial No. 572,971

15 Claims. (Cl. 62—115)

This invention relates to improvements in drinking water coolers, and has, among its objects: to provide improved structures for heat insulating the water reservoir; to provide means for reducing transmission of vibrations from the refrigerating plant to the main housing; to provide a supporting means for the refrigerating plant which is detachable and which can be quickly and cheaply assembled; to provide a novel ventilating arrangement for the condenser coils; to utilize the condenser operating means for controlling ventilation for the condenser coils and compressor; to provide means for detachably securing a thermostat to the water receptacle; to provide a cheap construction for the main housing; and to facilitate assembly and reduce manufacturing costs.

Features include all details of construction, the assembly arrangement of the parts, along with the broader ideas of means.

Objects, features, and advantages of the invention will be set forth in the description of the drawings forming a part of this application, and in said drawings.

Figure 6 is a detail view of the compressor driving pulley and fan; and

Figure 7 is a vertical section through the top part of the upper chamber and water receptacle illustrating a modification.

Figure 1:
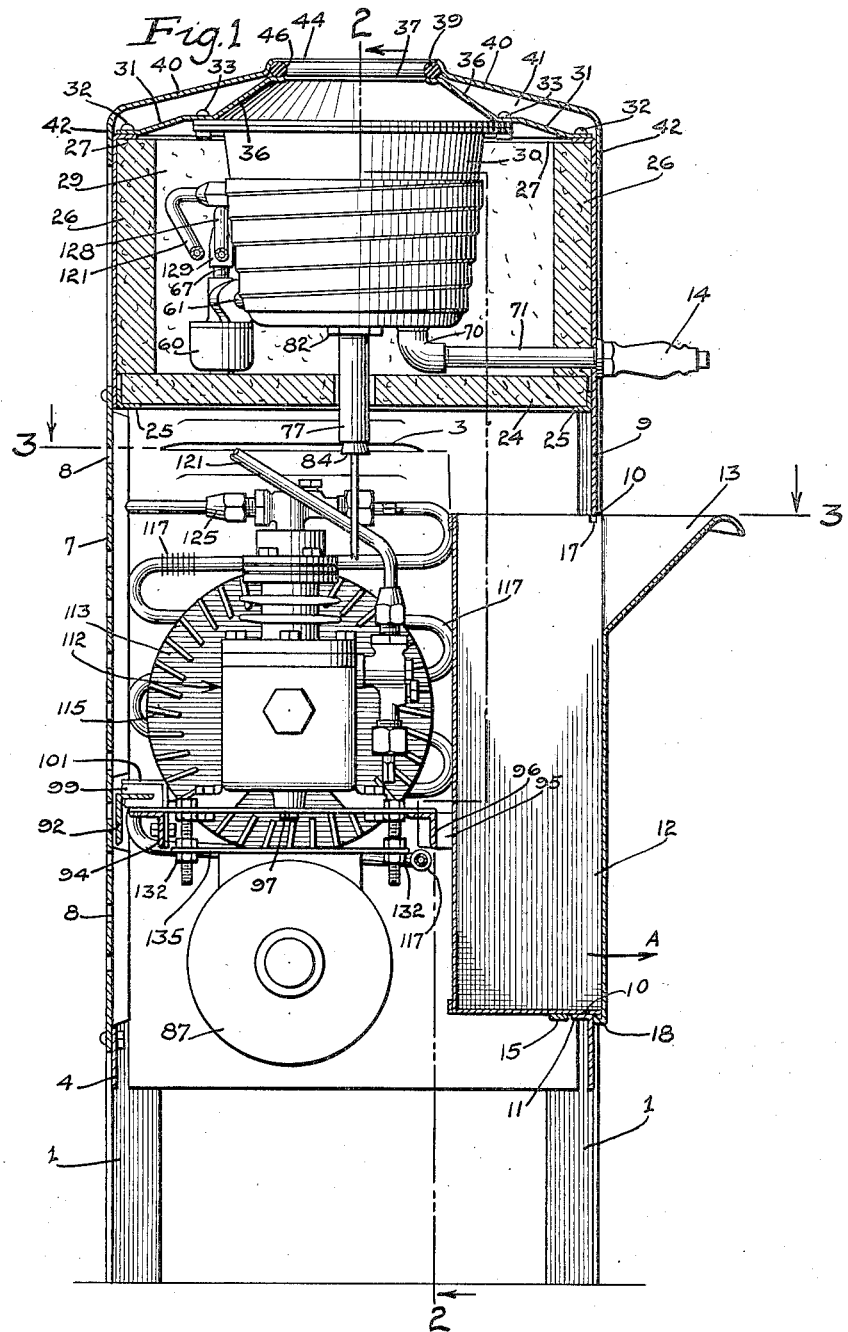
Figure 1 is a vertical section taken approximately on line 1—1 of Figure 2.

A main housing is formed as follows, and includes structural details which are features of the invention: Numeral 1 indicates angle irons which form corner elements and legs. Sheet metal plates 2 cross-connect the irons on two opposite sides, each plate being stamped to provide a louver indicated at 3. A plate 4 (see Figure 3) cross-connects the angle irons 1 at the rear of the casing and, this plate has an opening 5 having its margins in-turned to form flanges 6. A closure plate 7, also marginally flanged, fits the opening 5 and is removably secured. The plate has ventilating perforations 8. The front of the housing is formed by a plate 9 connected with angle irons 1 and this plate has an opening 10, the lower margin of which is inturned as at 11, see Figure 1; this opening is closed by a drip receptacle 12 which also is adapted to receive used drinking cups. The receptacle 12 has its upper portion extended outwardly as at 13 to underlie the spigot 14. This receptacle is removable and the following construction, a feature of the invention, is provided for this purpose: The bottom of the receptacle has, on its lower side, a notch which is received by the lower margin of the opening 10. This notch is partly formed by a strip 15. The upper part of the receptacle is notched as at 17 and these notches are vertically aligned with the plate 9 so that the receptacle can be raised to bring strip 15 above the level of the lower margin of opening 10. The receptacle is then swung outwardly in direction of the arrow A about the upper margin of the opening as an axis, to bring strip 15 to the outside, after which the receptacle is lowered to disengage notches 17, and withdrawn horizontally. A reverse operation positions the receptacle as shown, and its rearward movement, after being positioned as shown in Figure 1, is prevented (see Figure 3) by engagement of the flanges 18, with the outer face of the plate 9.

The main housing is provided with an upper rectangular chamber 29 formed of slabs of heat insulating material, the bottom slab 24 being supported by angle irons 25. The remaining vertical walls of the chamber are formed by slabs 26. The upper ends of the plates which form the sides of the main casing are in-turned as at 27, and the upper edges of the slabs 26 fit beneath these flanges.

A feature of this invention relates to the arrangement of a water receptacle in this insulated chamber, and to means cooperative with the water receptacle and with the walls of the chamber (or of the main housing) to provide cover means adapted to reduce to a minimum heat conduction to the chamber and receptacle.

Referring first to Figure 1: A water receptacle is indicated at 30 and this receptacle is arranged within the chamber 29 formed by the slabs 26—26. The receptacle is spaced from the walls of the chamber and suitable insulating sheathing, not shown, is usually wrapped or packed about the receptacle. A cover element is indicated at 31 (see Figures 2 and 4) and is connected as at 32 to the in-turned flanges 27. This element 31 is also connected by bolts 33, see Figure 4, to a flange 34 of the water receptacle 30. A gasket 35 is interposed between the flange 34 and the cover 31 as shown. The cover element 31 has an upwardly convergent central tubular conical portion 36 which provides an opening 37 surrounded by a marginal depression 38 which depression receives and sockets a gasket 39 which thus surrounds the opening. A plate 40 forming part of the cover is spaced therefrom to provide the dead air chamber 41 and this plate or cover section has downturned portion or flange 42 which detachably engages the outer wall of the main casing as a lid. Plate 40 acts as means for securing the gasket in operative position. This plate is provided with an opening 44 which provides a marginal socket 45 which compressively engages the upper portion of the gasket. A portion 46 of the gasket is exposed to be sealingly engaged by the neck end of a bottle 47, see Figure 2, the neck 48 of the bottle extending through the gasket and into the water receptacle 30 in the usual manner.

Figure 4:
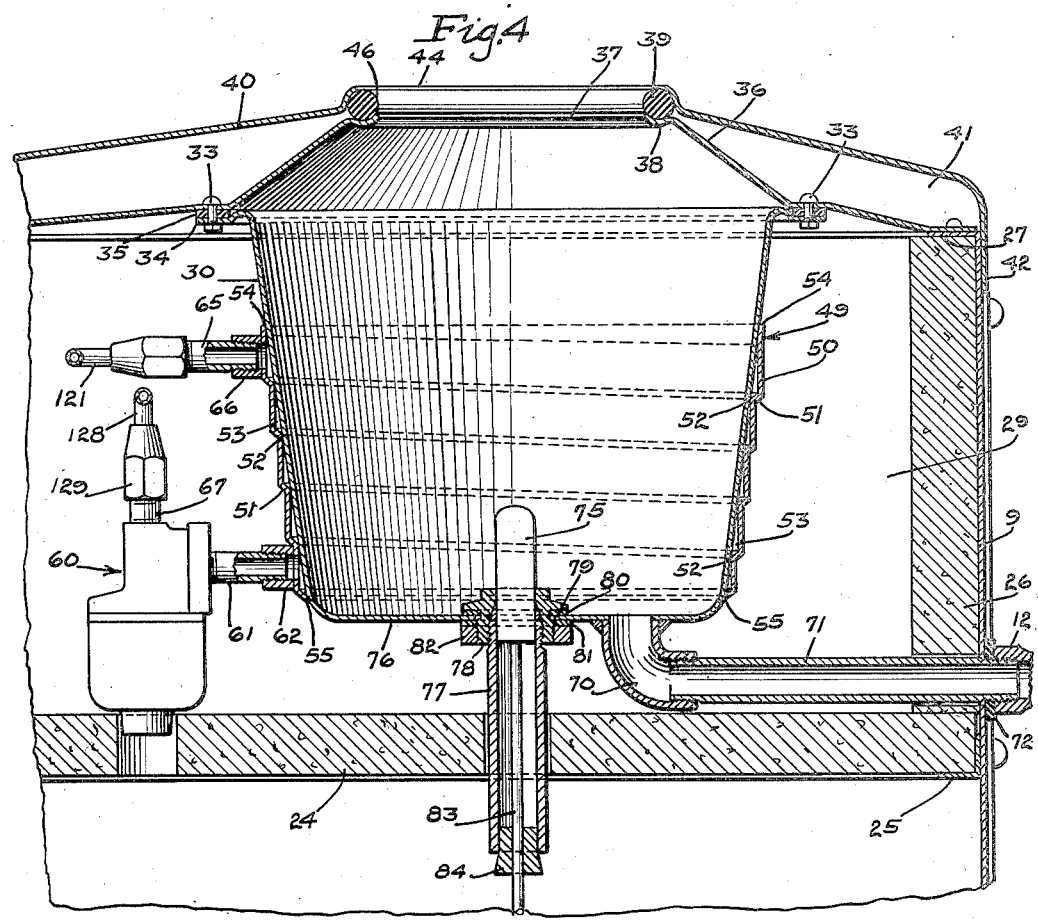
Figure 4 is a vertical section illustrating the construction of and connections for the water receptacle.
Figure 5:
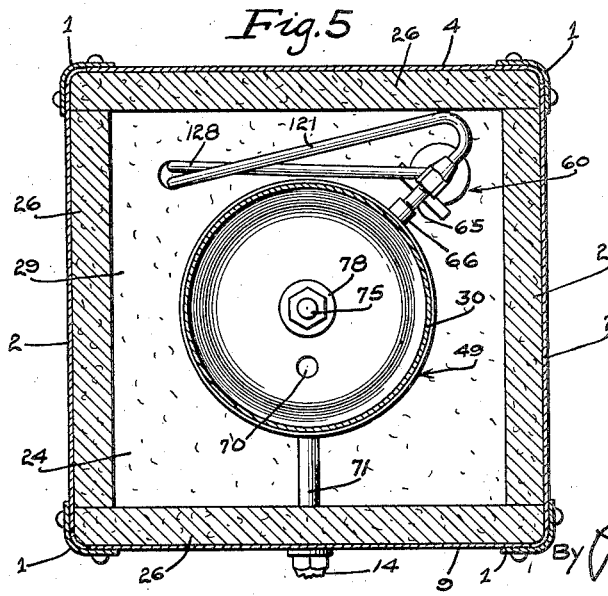
Figure 5 is a plan section approximately on line 5—5 of Figure 2.

Referring to Figure 4, a construction is shown by which refrigerating effects are transferred to the receptacle 30. The vessel is downwardly tapered, and is in this instance of conical configuration. A conical sleeve 49 is fitted over the outer side of the vessel and its angle of taper corresponds to that of the vessel. The sleeve is punched to provide portions 50 which are spaced from the wall of the vessel, and these portions are connected by portions 51 which converge downwardly and which at their angular junction with the portions 50 have sealing, spiral-line or knife-edge contact as at 52 with the outer surface of the receptacle. This provides a single continuous spiral passage generally indicated at 53. When the sleeve is forced into position, the spiral line contact occurs and then the sleeve is circumferentially soldered at opposite ends as at 54—55. The portions 51 allow for expansion and contraction of the sleeve lengthwise, as well as circumferentially without putting undue strain on the soldered or brazed connections 54—55.

Means is provided which connects with the said spiral passage for circulating refrigerant therein. This means includes an expansion valve generally indicated at 60 suitably connected by nipple 61 with a threaded tubular extension 62 which communicates with the lower extremity of the spiral passage. A nipple 65 is in threaded connection with a tubular element 66, which communicates with the upper end of the spiral passage. The pipe 65 is connected with the suction side of the compressor of the refrigerating plant, described below, and the pipe 67 of the expansion valve 60 is connected with a receiver associated with the condensing coils. An elbow 70 in pipe 71 forms the passage for withdrawing water from the bottom of the receptacle. The elbow 70 is suitably soldered. The pipe 71 passes through the insulating wall 26, and through plate 9, and is terminally threaded. To this threaded portion is attached the spigot, or valve 12, a washer 72 being interposed as shown between the end of the valve casing and the plate 9.

The operation of the compressor motor is controlled by a thermostat 75 which is detachably mounted in the lower wall 76 of the receptacle 30. The bulb is passed upwardly through a pipe 77, which pipe has threaded connection with a plug 78 passing through an opening 79 of the receptacle. The end of the pipe 77 compresses packing placed in the plug and surrounding the bulb. Gaskets 80—81 are interposed as shown and nut 82 sealingly clamps the plug in operative position. The thermostat is of the gas-expansion type, and the bulb has the usual tube 83 which extends downwardly through a plug 84. The pipe passes to the switch control box 85, see Figure 2. Inasmuch as the present invention does not relate to the construction of the thermostatically controlled switch mechanism, this construction is not illustrated. However, the wiring connection for the motor is carried through cable 86, the motor being indicated at 87. The bulb usually controls a switch in the motor circuit.

Another feature of this invention relates to the mounting of the refrigeration plant or machinery so that vibrations resultant from its operation are not unduly transmitted to the main structure. Another features relates to the arrangement of the parts on a single mounting. To these ends, this plant is mounted on a frame which, in turn, is suspended by means of resilient con-iron 90 and an angle iron 91. Attached to the sides 2 (see Figure 3), are respectively an angle iron 90 and an angle iron 91. Attached to the plate 4 is a rear iron 92, having a horizontal flange which is coplanar with the corresponding flanges of the irons 90 and 91. A three-sided ledge is thus formed. The iron 90 extends the full length but the iron 91 is short, so as not to interfere with the downward extension of the condenser coils and pulley-fan. Arranged below the horizontal flanges of the irons 90, 91, 92 is a frame composed of side irons 93, 95, a front iron 96 cross-connecting irons 93, 95 and rear iron 94 which is connected at one end to iron 93. The front and rear irons 96 and 94 are cross-connected by a plate 97. These irons are welded together with their upper faces in coplanar relation. The open frame thus formed does not interfere with the downward extension of the condenser coils and pulley-fan.

Cushion members 99 are interposed, as shown, between the angle irons 90 and 93, 92 and 94, and 91 and 95. These cushion members are held in position by angle irons respectively indicated 100, 101 and 102. The side view of one of these irons 101 is shown in Figure 1 at the left. Each cushion member 99 comprises a thick sheet of rubber folded over the horizontal flange of respective irons. A cushion extension of member 99 engages (see left of Figures 2 and 3) the face of the vertical flange of an angle iron 107 carried by the angle iron 93. A similar extension thrust member 108 (see top and right of Figure 3) engages the vertical flange 109 of an angle iron carried by angle iron 94. Cushion extensions 110—111 of members 94 are interposed respectively between the front ends of the angle irons 93 and 95 and the plate 9 to reduce vibration from horizontal thrusts. Upon the top of the plate 97 is arranged the compressor generally indicated at 112. The compressor is operated by means of a pulley indicated at 113, see Figures 2 and 3, which pulley is mounted on the compressor shaft 114. This pulley also acts as a fan and for this purpose, each side is provided with a series of fins, the series being respectively indicated 115—116. The fins extend perpendicularly from the corresponding vertical faces and are arranged tangentially with respect to a circle whose center is the axis of rotation. The fins 115 are not as long as fins 116. The fins 116 are opposed to the louver 3 and are adapted to suck air inwardly through the louver. The fins 115 are adapted to suck air across the compressor to assist in cooling it. The condenser coils 117 are disposed adjacent the louver 3 and between the louver and the fins 116. The coils are arranged and spaced one above the other in a vertical plane and extend horizontally, parallel with plate 2. The condenser coil is connected by one end with the pressure side of the pump as at 125, and the coil at the opposite end is connected with the receiver 124 as at 126, see Figure 2. The opposite end of the receiver is connected as at 127 by a pipe 128 which at its opposite end connects by means of the coupling 129 through nipple 67, with the expansion valve 68, see Figures 1 and 4.

The motor 87 operates a pulley 130 which is connected by belt 131 with pulley 113. This motor is attached to a horizontal plate 135 adjustably held by nuts 132 and screws 133, the screws being mounted on plate 97. By this means, the motor can be raised and lowered to tighten the belt.

The receiver 124 is also mounted on the frame with the other parts of the refrigeration apparatus. The tubes 83, 121 and 128 have bends therein of such character that no substantial vibration is transmitted by them. Each tube may be provided with a coil of few whorls to minimize vibration effects.

Figure 2:
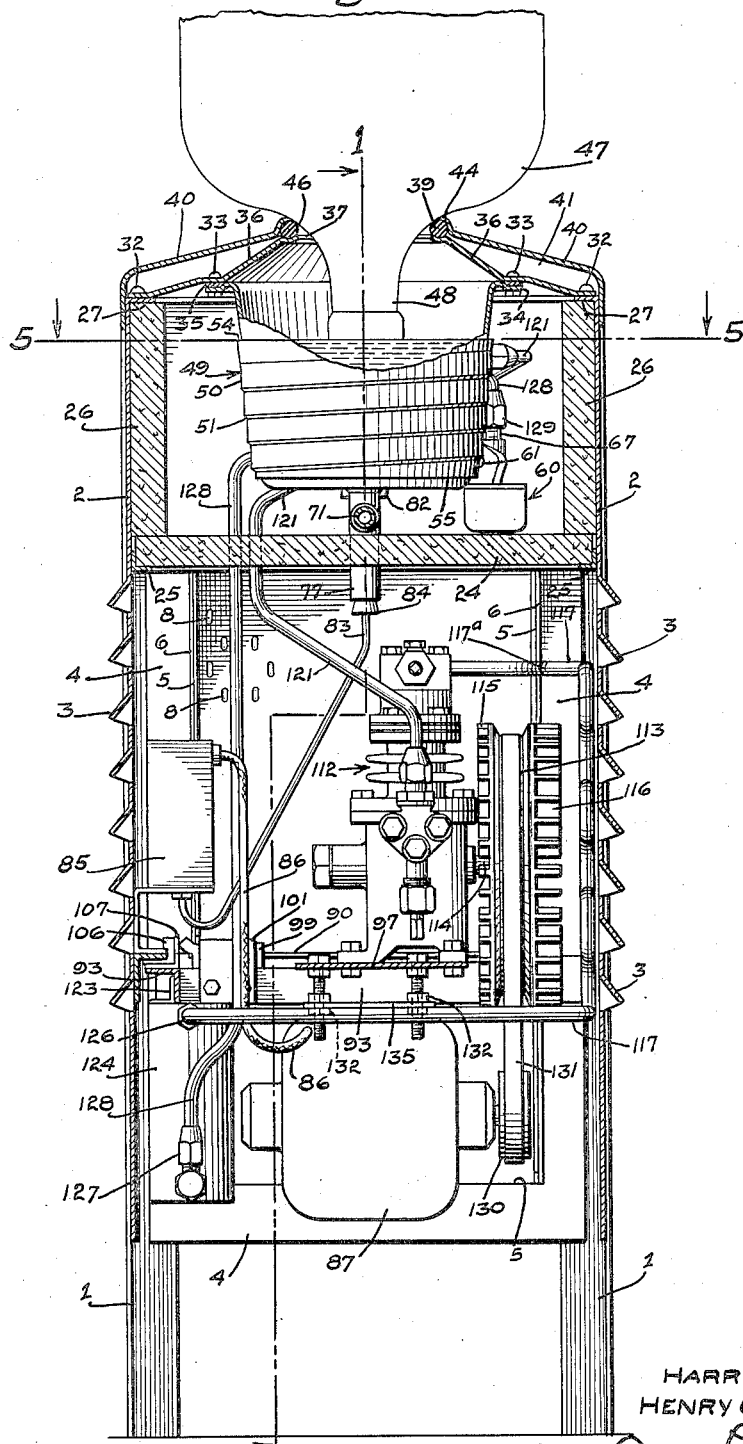
Figure 2 is a vertical section taken approximately on line 2—2 of Figure 1.

The receiver 124 is connected by an angle iron 123 to the vertical flange of the angle iron 93, see Figure 2. This receiver is located adjacent the back of the housing, see Figure 3.

In assembling the frame which supports the refrigerating plant, the elements 99 are slipped over the flanges, the frame is held against the lower sides of the cushions 99 and the angle irons 100, 101, 102 are then positioned and secured by bolts to the vertical flange of the corresponding iron of the frame.

A feature is the arrangement of a double fan between the compressor and condensing coils 117, which coils are between said pulley or fan and the louver. In this way, the pulley fan acts to cool the condenser coils as well as the engine.

Figure 3:
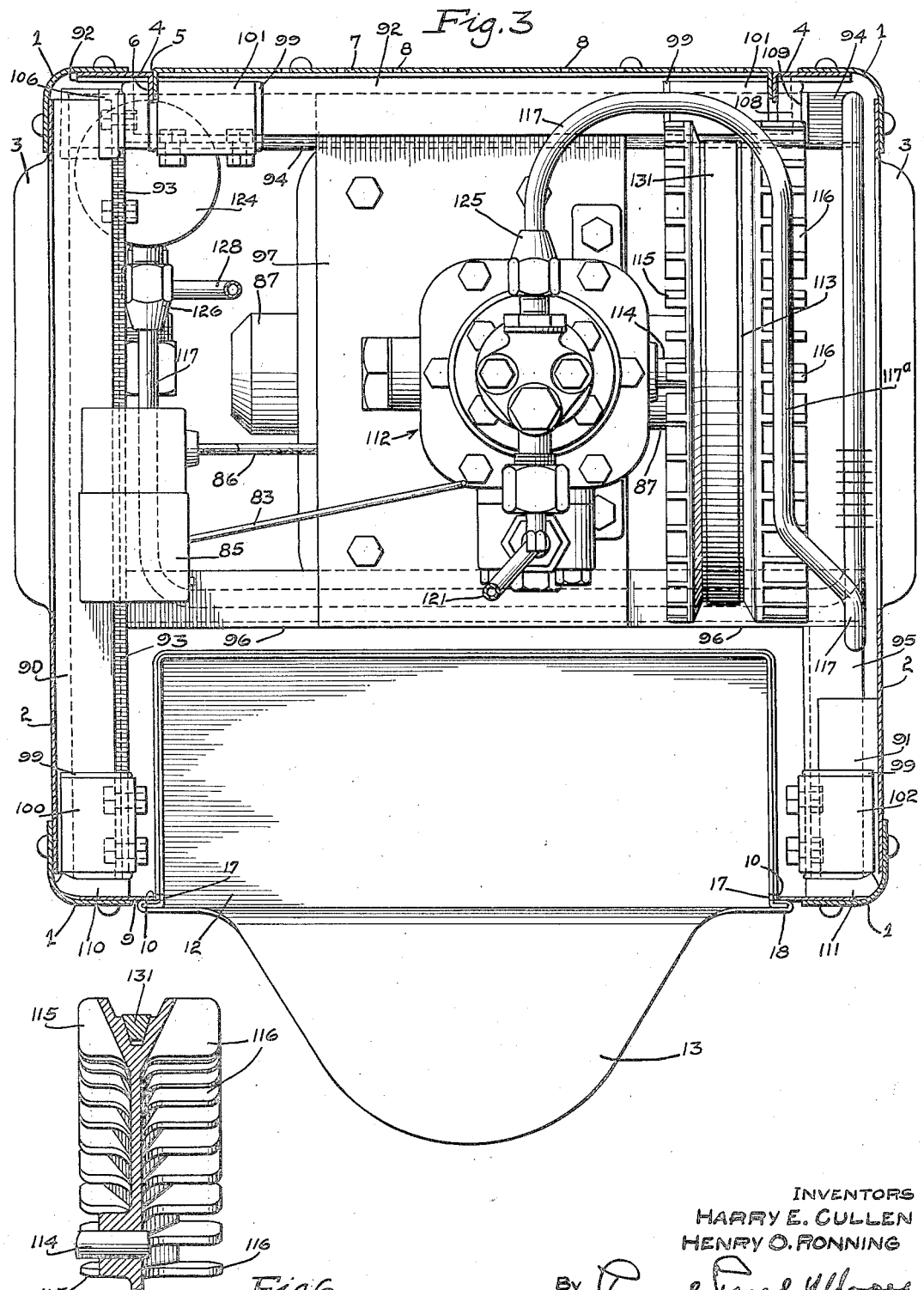
Figure 3 is a plan section taken approximately on line 3—3 of Figure 1.

Another feature relates to the arrangement of the uppermost coil 117a over the fan 116 as best shown in Figure 3 so that air from fan 116 is thrown directly upwardly against this portion of the coil.

In Figure 7, a modified form of heat insulating cover for the water receptacle is shown. This construction is adapted to be readily dis-assembled for cleaning purposes. To this end, the water receptacle 30 is provided as in the first form with the flange 32 and gasket 33. Attached compressively against this gasket and secured to the flange 32 by means of screws 34 is a plate 140 the outer portion of which is attached by screws 141 to clips 142. The outer end of the plate 140 is curved to conform to the upper curved extremities of the side plates 143 of the housing. A tubular stopper-like cover for the receptacle is indicated at 150 and provides a tapering portion 151 sealingly engaging within the receptacle, and the upwardly convergent conical portion 151 providing an opening 152. Fitted within this opening is a gasket 153, the gasket providing a reduced portion 154 which engages in the opening 152. The gasket is circumferentially grooved as at 155 to receive the marginal portions of an opening 157 of a wall-forming member 156. The upper end of the gasket overlies this member 156 as shown. The member 156 is tubular and provides an upwardly convergent conical portion 158 spaced from the sides 151, and said member forms with the cover 150 and the plate 140, a dead air space adapted to oppose heat conduction to the chamber. The member 156 has a downwardly curved marginal portion or flange 159 which engages a gasket 160 lying on top of the plate 140. The curved portions 159 are so formed as to be adapted to be pressed downwardly and to frictionally hold the plate 156 in operative position. A dead air space 161 is thus formed substantially in the manner of the first described form of this part of the invention, but assembly and disassembly are much facilitated by this construction.

The refrigerating device herein illustrated is of the low pressure control type designed for the use of sulphur di-oxide as a refrigerant. The apparatus per se is not claimed, but only the assembly arranged in the housing, and the relations of the fan, coils, compressor, etc., to the housing.

The refrigerating apparatus is accessible by removal of the back plate 5 and/or the drip receptacle.

Ventilation for the housing is obtainable through the louvers and the openings 8 of plate 5, as well as across the top of the catch receptacle, and through the bottom of the housing which is not closed.

We claim as our invention:

1. In combination, a housing having walls at least one of which has a louver, a support within the housing and means attaching the support to the housing to reduce transmission of vibration from support to housing, a refrigerator apparatus having its elements mounted on the support, and including a compressor, condenser coils arranged adjacent the louver in spaced superposed relation, a drive pulley for the compressor arranged between the compressor and coils at the level of the louver, said pulley having on each side of its lateral opposite faces a fan, said fans respectively adapted to suck air through the louver and across the coils, and to dissipate compressor heat, said refrigerating apparatus including a motor which has a driving connection with the pulley, a portion of said coil being arranged over the pulley, a water receptacle and means by which refrigerant effects are transferred from the refrigerating apparatus to the walls of the receptacle.

2. In combination a housing having walls at least one of which has a louver, a support within the housing and means attaching the support to the housing to reduce transmission of vibration from support to housing, a refrigerating apparatus including a compressor mounted on the support at its upper side, a receiver and motor mounted on the support at its lower side, condenser coils connected with the receiver and compressor, said coils being arranged adjacent the louver in spaced superposed relation, a drive pulley for the compressor arranged between the compressor and the coils at the level of the louver, said pulley having on each of its lateral opposite faces a fan, said fans respectively adapted to suck air through the louver and across the coils, and dissipate compressor heat, said motor having a driving connection with the pulley, said housing providing a chamber above the refrigerating plant, a water receptacle in the chamber, and means by which the refrigerating apparatus cools the contents of the receptacle including tubes interconnected with receptacle and plant and which are so formed as to reduce to a minimum the transmission of vibration therethrough.

3. In combination a housing having walls at least one of which has a louver, a support within the housing, a refrigerating apparatus including a compressor attached to the support at its upper side, a receiver attached to and beneath the support, a tube connecting the receiver with the compression side of the compressor, said tube providing coils and said coils being arranged adjacent the louver in spaced superposed relation, a drive pulley for the compressor arranged between the compressor and the coils at the level of the louver, said pulley having on opposite faces fan blades respectively adapted to suck air through the louver and across the coils and to dissipate compressor heat, a motor attached to the bottom of the support and having a driving connection with the pulley, said housing providing a chamber above the refrigerating plant, a water receptacle in the chamber, and means by which refrigerating effects are applied to the contents of the receptacle including tubes which are so formed as to reduce to a minimum the transmission of vibration from said refrigerating plant, through them to the housing.

4. In combination, a housing, a refrigerator apparatus supported within the housing including a compressor, condenser coils, a driver for the compressor and fan means movable with the driver and arranged to dissipate compressor and condenser coil heat, by drawing air toward the driver from opposite directions.

5. In combination, a housing, a refrigerator apparatus supported within the housing including a compressor, condenser coils, a driver for the compressor arranged between the compressor and coils, and means movable with the driver for creating drafts from opposite directions respectively adapted to suck air across the coils and to dissipate compressor heat.

6. In combination, a housing having walls at least one of which has a louver, a refrigerator apparatus within the housing including a compressor, condenser coils arranged adjacent the louver, a driver for the compressor arranged between the compressor and coils at the level of the louver, said driver having two fans which are respectively adapted to suck air from opposite directions through the louver and across the coils, and across the compressor, and to eject the air in a direction substantially perpendicular to its suction direction.

7. In combination, a housing having walls at least one of which has a louver, a refrigerator apparatus within the housing including a compressor, condenser coils arranged adjacent the louver in spaced superposed relation, a drive pulley for the compressor arranged between the compressor and coils at the level of the louver, said pulley having on each of its lateral opposite faces a fan, said fans respectively adapted to suck air through the louver and across the coils, and to dissipate compressor heat.

8. In combination, a housing having vertical walls at least one of which has a louver, a support within the housing and means attaching the support within and to the housing to reduce transmission of vibration from support to housing, a refrigerator apparatus having its elements mounted on the support, and including a compressor, condenser coils arranged adjacent the louver in spaced superposed relation, a driver for the compressor arranged between the compressor and coils at the level of the louver, said driver having fans which are respectively adapted to suck air from opposite directions through the louver, and across the coils, and across the compressor.

9. In combination a casing providing a chamber, the walls of which have ventilating openings, a refrigerating compressor in the casing, means for operating the compressor including a rotatable driver having one face opposed to the compressor, means movable with the driver and arranged to suck air from opposite directions toward the driver faces, and then eject the air in a direction parallel with those faces, and condenser coils associated with the compressor and arranged between the driver and suction means and a side of the casing in opposition to some of the ventilation openings.

10. In combination a housing, a refrigerating apparatus within the housing including a compressor, a rotatable driver for the compressor having fan means movable therewith and so designed as to suck air toward the side face of the driver in a direction substantially perpendicular to that face and parallel with the axis of rotation, and then eject the air centrifugally in a direction substantially parallel with that face, condenser coils connected with the compressor and having a portion which is nearest the compression side of the compressor arranged in the path of ejection, and having other portions more remote from said compression side arranged in the suction path.

11. A water dispensing apparatus including a housing, a water receptacle within the housing having a dispensing spigot outside of the housing, a refrigerating apparatus within the housing and means by which it refrigerates water at the receptacle, an opening in one wall of the housing at a level below the spigot and giving access to the refrigerating apparatus, a drip receptacle as a closure for the opening and lying wholly within the casing when in closure position, said receptacle having a pouring and drip-catch lip which is so disposed as to catch drippings from the spigot and lead them into the receptacle, and means releasably securing the receptacle in closure position.

12. A water dispensing apparatus including a housing, a water receptacle within the housing having a dispensing spigot outside of the housing, a refrigerating apparatus within the housing and means by which it refrigerates water at the receptacle, an opening in one wall of the housing at a level below the spigot and giving access to the refrigerating apparatus, a drip receptacle as a closure for the opening and lying within the casing when in closure position, said receptacle having a pouring and drip-catch lip which is so disposed as to catch drippings from the spigot and lead them into the receptacle, and means releasably securing the receptacle in closure position, including means carried by the receptacle cooperative with the upper and lower margins of the opening in a manner to obtain release of the receptacle as a result of slight vertical movements of the receptacle.

13. A water dispensing apparatus including a housing, a water receptacle within the housing having a dispensing spigot outside of the housing, an opening in one wall of the housing, a drip receptacle as a closure for the opening, said receptacle having a projecting pouring lip so disposed as to catch drippings from the spigot and lead them into the receptacle, and means on the receptacle cooperative with the upper and lower margins of the openings for releasably securing the receptacle in closure position and adapted to obtain release of the receptacle as a result of slight vertical and swinging motions.

14. A water dispensing apparatus including a housing, a water receptacle within the housing having a dispensing spigot outside of the housing, an opening in one wall of the housing, a drip receptacle as a closure for the opening disposed within the housing, said receptacle having means engaging the housing to limit inward movement of the receptacle, said receptacle having a projecting pouring lip so disposed as to catch drippings from the spigot and lead them into the receptacle, and means releasably securing the receptacle to the housing in closure position including a support upon which the outermost portion only of the lower part of the receptacle rests by gravity, and means to prevent outward motion of the receptacle relatively to said support, whereby the weight of that part of the receptacle within the housing acts by gravity to hold the receptacle in operative position.

15. A water dispensing apparatus including a housing, a water receptacle within the housing having a dispensing spigot outside of the housing, an opening in one wall of the housing, a drip receptacle as a closure for the opening and lying within the casing with its front wall flush with the front wall of the housing, said receptacle having a projecting pouring lip so disposed as to catch drippings from the spigot and lead them into the receptacle, and means releasably securing the receptacle to the housing in closure position and adapted to be released as a result of slightly raising the receptacle then swinging it outwardly and then lowering it.

HARRY E. CULLEN.
HENRY O. RONNING.